US009167837B2

(12) United States Patent
Trinnaman et al.

(10) Patent No.: US 9,167,837 B2
(45) Date of Patent: Oct. 27, 2015

(54) PEPTIDES IMPARTING UMAMI, SALT, DAIRY AND BITTER FLAVOR

(75) Inventors: Laurence Trinnaman, Montvale, NJ (US); Zhihua Liu, East Brunswick, NJ (US); Linda Ann Psota-Kelty, Tinton Falls, NJ (US); Zhen Chen, Aberdeen, NJ (US)

(73) Assignee: International Flavors & Fragrances Inc., New York, NY (US)

(*) Notice: Subject to any disclaimer, the term of this patent is extended or adjusted under 35 U.S.C. 154(b) by 2260 days.

(21) Appl. No.: 11/949,438

(22) Filed: Dec. 3, 2007

(65) Prior Publication Data

US 2009/0143488 A1    Jun. 4, 2009

(51) Int. Cl.
*A23L 1/227*  (2006.01)
*A23L 1/39*   (2006.01)

(52) U.S. Cl.
CPC .. *A23L 1/227* (2013.01); *A23L 1/39* (2013.01)

(58) Field of Classification Search
CPC ...................................................... A23L 1/227
See application file for complete search history.

(56) References Cited

U.S. PATENT DOCUMENTS

2005/0008751 A1    1/2005  Draaisma et al. ............. 426/583

FOREIGN PATENT DOCUMENTS

| EP | 832972 A2 * | 4/1998 | ............. C12N 15/12 |
|---|---|---|---|
| JP | 04288098 A * | 10/1992 | ............. C07K 7/06 |
| JP | 06239888 A * | 8/1994 | ............. C07K 7/08 |
| JP | 101086876 | 4/1998 | |
| WO | WO 02/071854 | 9/2002 | |

OTHER PUBLICATIONS

English translation of JP04288098 Kusaka et al. Oct. 1992.*
Hernández-Ledesma et al., "Identification of bioactive peptides after digestion of human milk and infant formula with pepsin and pancreatin", International Dairy Journal 2007 17:42-49.
Losito et al., "Identification of peptides in antimicrobial fractions of cheese extracts by electrospray ionization ion trap mass spectrometry coupled to a two-dimensional liquid chromatographic separation", Rapid Communications in Mass Spectrometry 2006 20:447-455.
Quirós et al., "Angiotensin-Converting Enzyme Inhibitory Activity of Peptides Derived from Caprine Kefir", J. Dairy Sci. 2005 88:3480-3487.
Sjögren Jörgen, "Bioassay-Guided Isolation and Characterisation of Antifungal Metabolites", Doctoral Thesis 2005.
Tanabe et al., "Isolation and Structural Elucidation of a Peptide Derived from Edam Cheese that Inhibits β-Lactoglobulin Transport", J. Dairy Sci. 2003 86:464-468.
Yamamoto et al., "Antihypertensive Effect of the Peptides Derived from Casein by an Extracelluar Proteinase from *Lactobacillus helveticus* CP790", J. Dairy Sci. 1994 77:917-922.

* cited by examiner

*Primary Examiner* — Christina Bradley
(74) *Attorney, Agent, or Firm* — XuFan Tseng; Martin Zhang; Elizabeth M. Quirk

(57) ABSTRACT

The invention relates to compositions and methods of using the flavor active peptides, Lys-Ile-His-Pro-Phe (SEQ ID NO:1), Gly-Pro-Phe-Pro-Ile (SEQ ID NO:2), and Lys-Lys-Tyr-Lys-Val-Pro-Gln (SEQ ID NO:3), to impart a bitter, salt, dairy or umami flavor to food or pharmaceutical products. In particular embodiments, the Lys-Lys-Tyr-Lys-Val-Pro-Gln (SEQ ID NO:3) peptide further imparts a vegetable, brothy, or bready flavor.

3 Claims, No Drawings

PEPTIDES IMPARTING UMAMI, SALT, DAIRY AND BITTER FLAVOR

BACKGROUND OF THE INVENTION

Flavor traditionally entails four main taste components: sourness, bitterness, saltiness and sweetness. Umami, or "deliciousness" in Japanese, is now considered to be a fifth taste component. Umami is the taste resulting from the natural occurrence or intentional addition of compounds, such as, monosodium glutamate (MSG), 5'-nucleotides, such as, 5'-inosinate (IMP) and 5'-guanylate (GMP). Such compounds are especially interesting in that they have the ability to modify taste, even though they do not possess characteristic flavors of their own, especially at the low concentrations at which they affect food flavor. Glutamate is the one molecule that has attracted the most attention due to its association with MSG.

A number of approaches to enhancing flavor have been proposed in the art. For example, the incorporation of yeast extracts or hydrolyzed proteins from both animal and plant sources has resulted in the flavor intensification/modification of various foods. This approach has specific application for many foods and beverages. For example, the addition of yeast extracts and hydrolyzed proteins has resulted in improved taste in, and an increased acceptance of, low-fat meat products, which would otherwise lack characteristic meat flavor.

There is a need in the art for specific compounds which can be produced or synthesized to modify taste.

SUMMARY OF THE INVENTION

The present invention is a food product or pharmaceutical product containing, as an additive, a flavor active peptide which imparts bitter, salt, dairy, or umami flavor. Flavor active peptides of the invention include Lys-Ile-His-Pro-Phe (SEQ ID NO:1), Gly-Pro-Phe-Pro-Ile (SEQ ID NO:2), and Lys-Lys-Tyr-Lys-Val-Pro-Gln (SEQ ID NO:3).

The present invention is also a method for imparting a bitter, salt, dairy, or umami flavor to a food product or pharmaceutical product by adding to a food product or pharmaceutical product a flavor active peptide, wherein the flavor active peptide is Lys-Ile-His-Pro-Phe (SEQ ID NO:1), Gly-Pro-Phe-Pro-Ile (SEQ ID NO:2), or Lys-Lys-Tyr-Lys-Val-Pro-Gln (SEQ ID NO:3).

In particular embodiments of the invention, the Lys-Lys-Tyr-Lys-Val-Pro-Gln (SEQ ID NO:3) peptide further imparts vegetable, brothy, and bready flavors.

DETAILED DESCRIPTION OF THE INVENTION

The present invention relates to flavor enhancement of food products or pharmaceutical products. Specifically, the present invention relates to flavor active peptides which impart bitter, salt, dairy, or umami flavor to a food or pharmaceutical product. In particular embodiments, the flavor active peptides have the sequences of Lys-Ile-His-Pro-Phe (SEQ ID NO:1), Gly-Pro-Phe-Pro-Ile (SEQ ID NO:2), and Lys-Lys-Tyr-Lys-Val-Pro-Gln (SEQ ID NO:3). In addition to bitter, salt, dairy, and umami flavors, the peptide Lys-Lys-Tyr-Lys-Val-Pro-Gln (SEQ ID NO:3) also imparts vegetable, brothy, and bready flavors.

As used herein, "flavor" refers to the perception of taste and/or smell in a subject (e.g., a human or other animal), which include sweet, sour, salty, bitter, umami, and others. In this regard, a "flavor active peptide" refers to a peptide or a biologically acceptable salt thereof that induces a flavor or taste in an animal or a human. As is conventional in the art, a "peptide" is a chain of at least two amino acids that are linked through peptide bonds. All peptide sequences herein are written from left to right in the direction from amino-terminus to carboxy-terminus, in accordance with common practice.

A peptide of the present invention can be produced by any suitable means including, enzymatic hydrolysis or digestion, recombinant or synthetic methods, or combinations thereof. Recombinant expression is conventionally achieved by inserting a nucleic acid encoding the peptide of interest into an expression vector, transforming the expression vector into a suitable host cell and expressing and purifying the peptide from host cell lysate or culture medium. Such methods are routinely employed in the art using commercially available expression vectors and host cells.

When a peptide of the invention is prepared by chemical synthesis, the synthesis can be carried out by any solid phase method or liquid phase method conventionally employed in synthesizing a peptide. The peptide thus synthesized can then be purified by a purification procedure commonly employed, for example, reverse phase high-performance liquid chromatography, chromatography with the use of an ion exchange resin or a high-porous polymer resin, affinity chromatography, etc.

Alternatively, a peptide of the invention can be isolated from a natural source, e.g., as a 5-7 amino acid residue peptide as disclosed herein, or as a portion of a longer peptide or polypeptide, which is proteolytically processed to produce the peptide of the invention. For example, Losito et al. ((2006) *Rapid Commun. Mass Spectrom.* 20:447-455) teach the isolation of the peptide Lys-Ile-His-Pro-Phe (SEQ ID NO:1) from aqueous extracts of Italian cheeses. This reference also teaches 9-17 amino acid residue peptides containing the sequence Gly-Pro-Phe-Pro-Ile (SEQ ID NO:2) peptide. Quirós et al. ((2002) *J. Dairy Sci.* 88:3480-3487) teach the release of the peptide Gly-Pro-Phe-Pro-Ile (SEQ ID NO:2) upon proteolytic digestion of such longer peptides. Furthermore, Hernandez-Ledesma et al. (2007) *Internatl. Dairy J.* 17:42-49) teach the isolation of the peptide Lys-Lys-Tyr-Lys-Val-Pro-Gln (SEQ ID NO:3) from infant formula IF-5 after digestion of the formula with pepsin and pancreatin.

In so far as a peptide of the invention is employed as an additive to a food product or pharmaceutical product, said peptide is desirably added to the food product or pharmaceutical product as an isolated peptide. "Isolated" when used to describe the peptides disclosed herein, means a peptide that has been identified and separated and/or recovered from contaminants such as other proteinaceous or non-proteinaceous molecules, or a peptide that has been chemically synthesized. The term isolated, however, does not preclude combining the instant peptide with other additives, excipients or diluents prior to use of the peptide as a flavor additive to a food product or pharmaceutical product.

Accordingly, an isolated peptide of the present invention may be formulated, if necessary, to contain various additives, excipients or diluent usable for food or drink, such as inorganic acids, organic acids, amino acids, nucleic acids, sugars, seasonings, and spices. Examples of inorganic acids include common salt, potassium chloride, ammonium chloride and the like. Examples of organic acids include carboxylic acids such as ascorbic acid, fumaric acid, malic acid, tartaric acid, citric acid and fatty acid, and salts thereof. Examples of salts include sodium and potassium salts. Examples of amino acids include sodium glutamate, glycine and the like. Examples of nucleic acids include sodium inosinate, sodium guanylate and the like. Examples of sugars include sucrose, glucose, lactose and the like. Examples of seasonings include natural seasonings such as soy sauce, miso or soybean paste and extracts. Examples of excipients include dextrin, i.e., a starch hydrolyzate, various starches and the like. Examples of diluents include water, oil, and the like. The amount of these additives may be appropriately determined depending on the intended use.

A peptide of the invention is employed as an additive in the sense that the peptide is added to a food product or pharmaceutical product and, directly or indirectly, becomes a component or otherwise affects the characteristics of the food product or pharmaceutical product, including a food product or pharmaceutical product intended for use in producing, manufacturing, packing, processing, preparing, treating, packaging, transporting, or holding a food product or pharmaceutical product.

The flavor active peptides of the present invention can be used to modify or enhance the flavor of any food product or pharmaceutical product where it is desired to impart a bitter, salt, dairy or umami flavor or, optionally a vegetable, brothy, or bready flavor, e.g., with the peptide set forth in SEQ ID NO:3. It is contemplated that the peptides of the invention can be used alone, in combination with one another, or in combination with other flavor modifying agents. Moreover, the flavor active peptides of the invention can take any forms such as liquid, powder or granule.

A flavor active peptide of the invention can be added as a part of the raw materials of a food or drink when the food or drink is produced or cooked, or otherwise added to a produced or cooked food or drink.

The amount of the flavor active peptide of the invention to be added can be determined according to a food or drink that is the subject of addition or to the taste of an individual adding the flavor active peptide to the food.

Flavor active peptides according to the invention have application in foods, beverages and medicinal products wherein bitter, salt, dairy or umami compounds are conventionally utilized. These products include products for human and animal consumption. This includes foods for consumption by agricultural animals, pets and zoo animals.

Accordingly, the invention also relates to a method for imparting a bitter, salt, dairy or umami flavor to a food product or pharmaceutical product by adding to the food product or pharmaceutical product a flavor active peptide having the amino acid sequence Lys-Ile-His-Pro-Phe (SEQ ID NO:1), Gly-Pro-Phe-Pro-Ile (SEQ ID NO:2), or Lys-Lys-Tyr-Lys-Val-Pro-Gln (SEQ ID NO:3).

Those of ordinary skill in the art of preparing and selling comestible products (i.e., edible foods or beverages, or precursors or flavor modifiers thereof) are well aware of a large variety of classes, subclasses and species of comestible products to which the instant peptides can be added. These include, without limitation, bread products including biscuits, crackers, and bread substitutes; pastries; cakes; cookies; breakfast cereals; dairy products such as cheese and processed cheese; soy-based desserts; snacks such as chips/crisps, popcorn, pretzels, and nuts; snack bars such as granola bars, breakfast bars, energy bars, fruit bars, and other snack bars; packaged meal products including slimming products, ready meals, canned ready meals, frozen ready meals, dried ready meals, chilled ready meals, dinner mixes, frozen pizza, chilled pizza, soup, canned soup, dehydrated soup, instant soup, chilled soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, and chilled noodles; oils and fats such as olive oil, vegetable and seed oil, cooking fats, butter, margarine, and spreadable oils and fats; sauces including dressings and condiments, tomato pastes and purees; bouillon/stock cubes; gravy granules; liquid stocks; herbs and spices; fermented sauces; soy-based sauces; wet sauces; dry sauces/powder mixes; ketchup; mayonnaise; mustard; salad dressings; dips; pickled products; baby food; milk formula; and yeast-based spreads.

As indicated, the instant peptides can also be employed in imparting a bitter, salt, dairy or umami flavor to a pharmaceutical product. Pharmaceutical products include, e.g., both solid and liquid compositions which are ingestible, non-toxic and have medicinal value. Such pharmaceutical products include cough syrups, cough drops, aspirin and chewable medicinal tablets.

In addition to being useful as food and pharmaceutical product additives, the instant peptides also find application in the production of antibodies. Such antibodies can be monoclonal or polyclonal and be produced using conventional approaches routinely employed in the art. An antibody raised against a peptide disclosed herein can be used to determine the expression and location of the peptide receptor(s) as well as in mimicking or blocking peptide binding to the receptor (i.e., agonizing or antagonizing receptor activity).

The invention is described in greater detail by the following non-limiting examples.

Example 1

Addition of Flavor Active Peptide to Cheese Sauce

Addition of the Gly-Pro-Phe-Pro-Ile (SEQ ID NO:2) peptide to the unflavored cheese sauce listed in Table 1 was carried out to evaluate the flavor imparted by the flavor active peptide. The cheese sauce formulation can be described as having a mild, Monterey Jack cheese sauce flavor with some salty and savory notes.

TABLE 1

| Amount (Grams)* | Ingredient |
| --- | --- |
| 51.500 | Monterey Jack Cheese |
| 0.035 | Vegetone Processed Cheese Color |
| 100.000 | Soybean Oil |
| 0.400 | Xanthan Gum Fine Gran |
| 0.525 | Sodium Phosphate Dibasic (dissolve in water with acid) |
| 0.450 | Lactic Acid USP 88/92 (dissolve in water with phosphate) |
| 783.840 | H$_2$O (Tap Water) |
| 7.500 | Wheat Flour All Purpose K.T. GMI |
| 20.000 | Starch Purity W (National Starch) |
| 15.000 | Milk Dry Non-Fat Super Heat |
| 10.000 | Salt Flour |

TABLE 1-continued

| Amount (Grams)* | Ingredient |
| --- | --- |
| 10.000 | Whey Sweet Extra Kosher |
| 0.750 | Whey Cultured Savor-Whey 80 |

*Total amount of 1000 grams.

After adding 0.015% (w/w based) Gly-Pro-Phe-Pro-Ile (SEQ ID NO:2) flavor active peptide to the cheese sauce, it made the sauce taste more salty, creamy and dairy.

Example 2

Addition of Flavor Active Peptide to Popcorn

Addition of the Gly-Pro-Phe-Pro-Ile (SEQ ID NO:2) peptide to the base microwave popcorn listed in Table 2 was carried out to evaluate the flavor imparted by the flavor active peptide.

TABLE 2

| Amount (grams)* | Ingredient |
| --- | --- |
| 66.25 | Popcorn Kernels |
| 30.98 | Hydrogenated Palm Oil |
| 2.77 | Microsized Salt |

*Total amount of 100 grams.

Preparation of seasoned popcorn was carried according to the amounts listed in Table 3.

TABLE 3

| Amount (grams)* | Ingredient |
| --- | --- |
| 90.82 | Popped Microwave Popcorn (see Table 2) |
| 9.08 | White Cheddar Snack Seasoning |
| 0.091 | Gly-Pro-Phe-Pro-Ile (SEQ ID NO: 2) peptide |

*Total amount of 100 grams.

The sodium content of the resulting seasoned popcorn was 596.6 mg $Na^+$/1 oz serving. The addition of approximately 0.1% of the flavor active peptide imparted an increase in cheesyness, mouthfeel, and some umami character.

What is claimed is:

1. A method for imparting a bitter, salt, dairy or umami flavor to an unflavored food product or pharmaceutical product comprising adding to an unflavored food product or pharmaceutical product in need of a bitter, salt, dairy or umami flavor, an isolated flavor active peptide Lys-Lys-Tyr-Lys-Val-Pro-Gln (SEQ ID NO:3) to impart a bitter, salt, dairy or umami flavor to the unflavored food product or pharmaceutical product.

2. The method of claim 1, wherein the Lys-Lys-Tyr-Lys-Val-Pro-Gln (SEQ ID NO:3) peptide further imparts a vegetable, brothy, or bready flavor to the food product or pharmaceutical product.

3. The method of claim 1, further comprising adding a flavor active peptide selected from the group of Lys-Ile-His-Pro-Phe (SEQ ID NO:1) and Gly-Pro-Phe-Pro-Ile (SEQ ID NO:2).

* * * * *

SEQUENCE LISTING

```
<160> NUMBER OF SEQ ID NOS: 3

<210> SEQ ID NO 1
<211> LENGTH: 5
<212> TYPE: PRT
<213> ORGANISM: Artificial sequence
<220> FEATURE:
<223> OTHER INFORMATION: Synthetic peptide

<400> SEQUENCE: 1

Lys Ile His Pro Phe
1               5

<210> SEQ ID NO 2
<211> LENGTH: 5
<212> TYPE: PRT
<213> ORGANISM: Artificial sequence
<220> FEATURE:
<223> OTHER INFORMATION: Synthetic peptide

<400> SEQUENCE: 2

Gly Pro Phe Pro Ile
1               5

<210> SEQ ID NO 3
<211> LENGTH: 7
<212> TYPE: PRT
<213> ORGANISM: Artificial sequence
<220> FEATURE:
<223> OTHER INFORMATION: Synthetic peptide

<400> SEQUENCE: 3

Lys Lys Tyr Lys Val Pro Gln
1               5
```